May 1, 1945. H. FRAUENTHAL ET AL 2,374,928
GRINDING, CUTTING OR BORING MACHINE
Filed Nov. 9, 1942 11 Sheets-Sheet 1
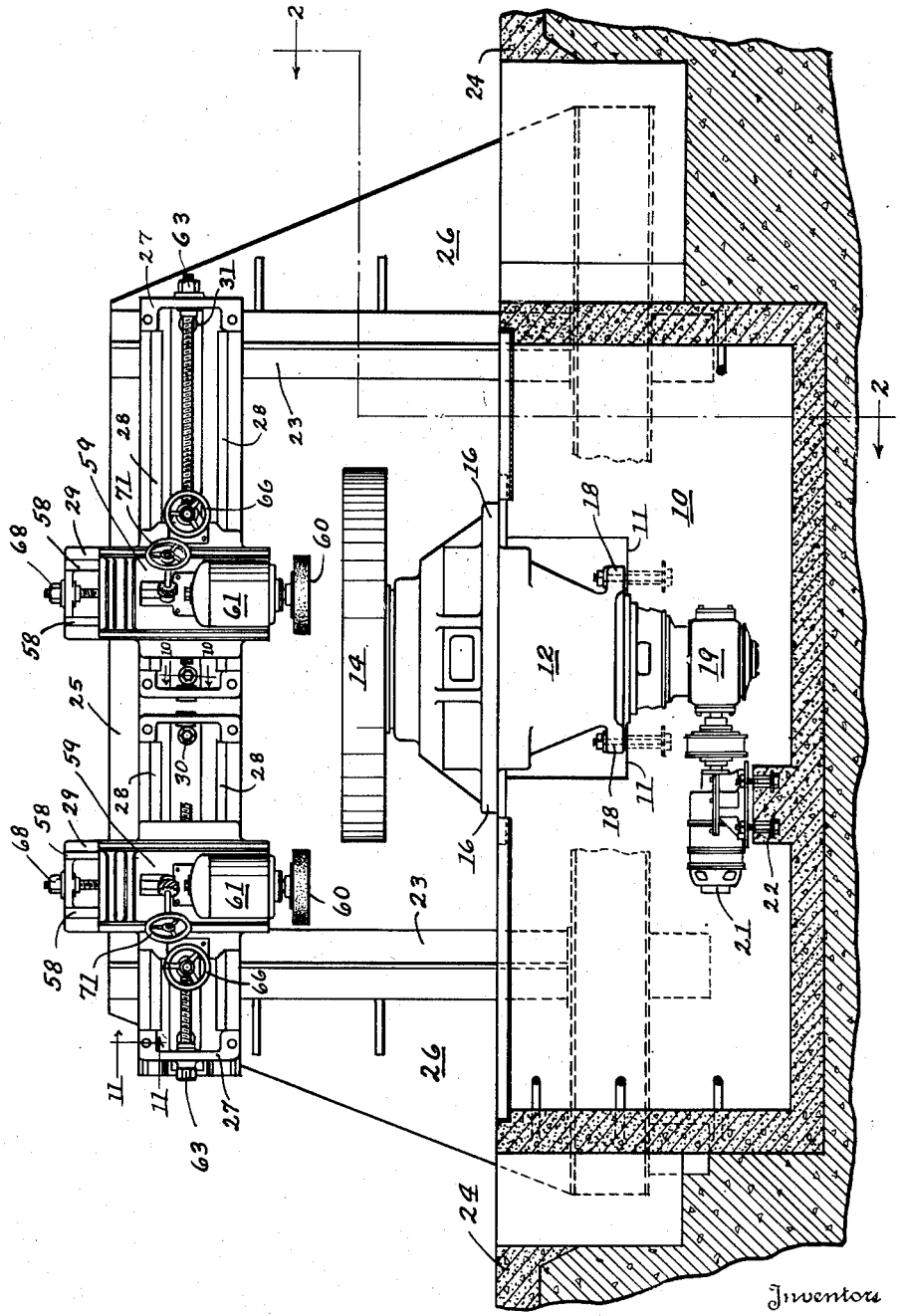
Inventors
Harold Frauenthal
Harold Moore Lochrane

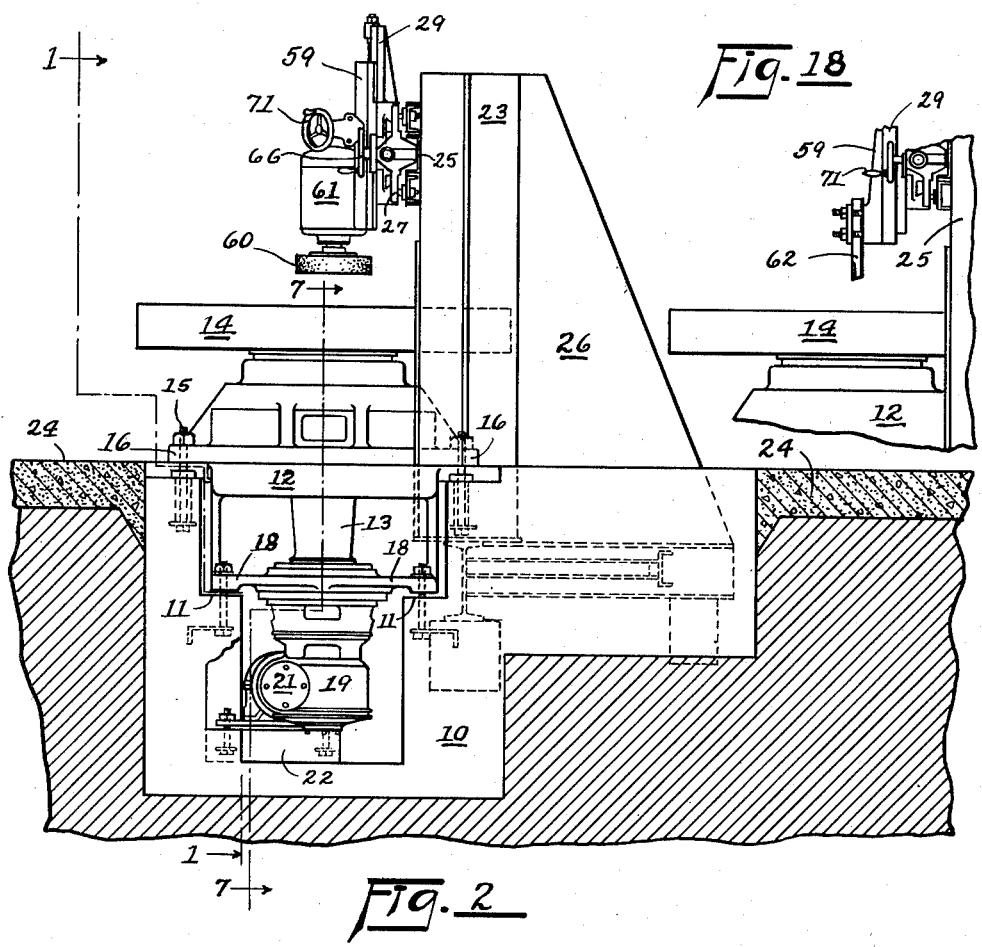

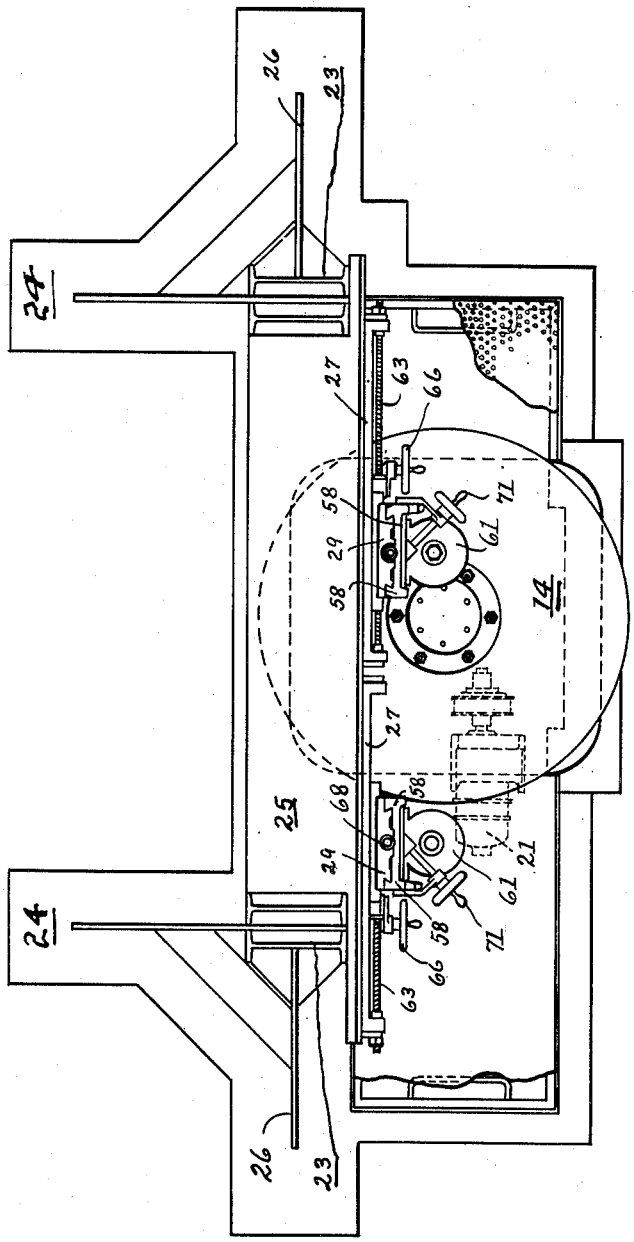

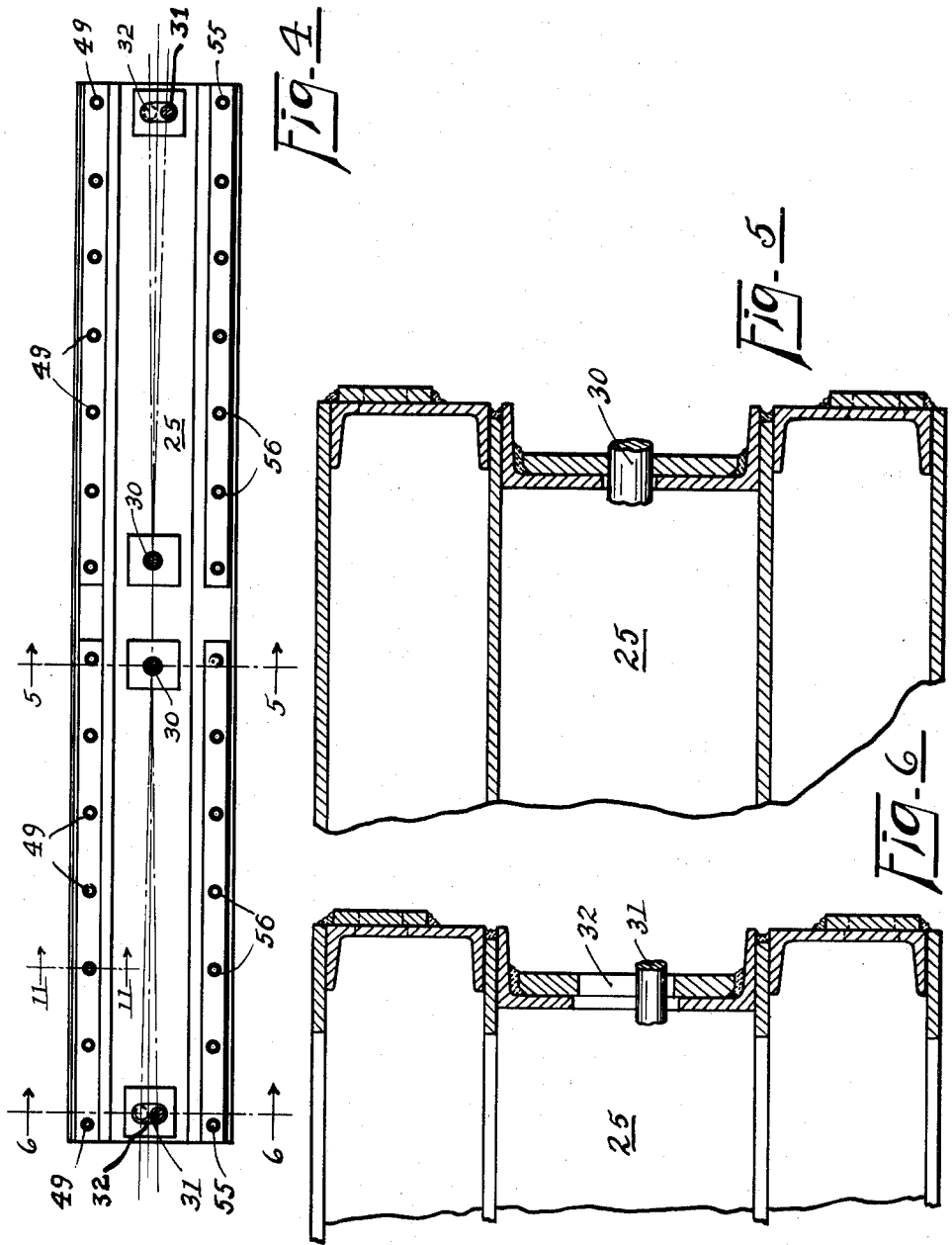

Inventors
Harold Frauenthal
Harold Moore Lochrane

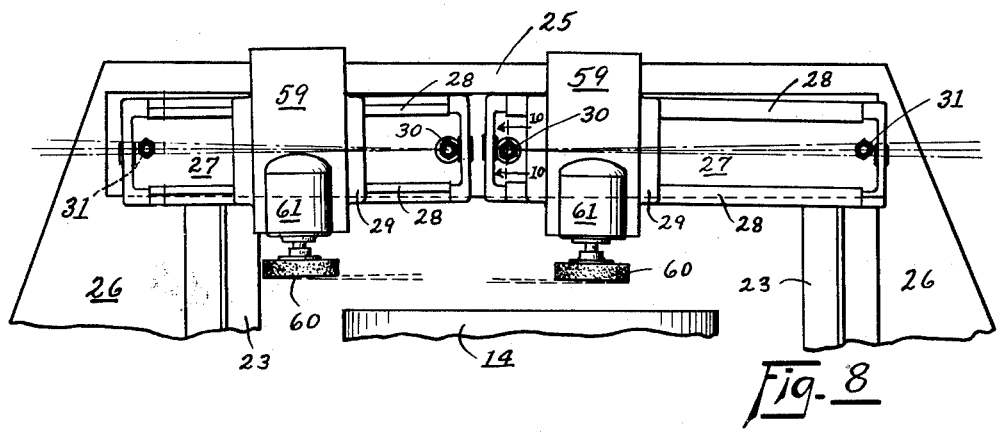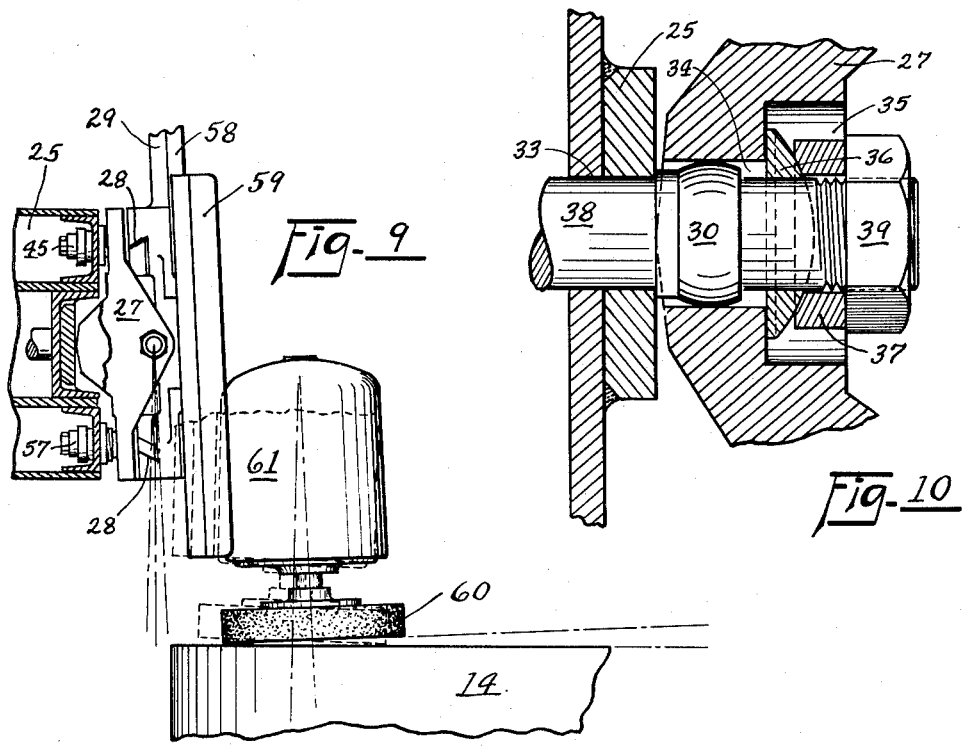

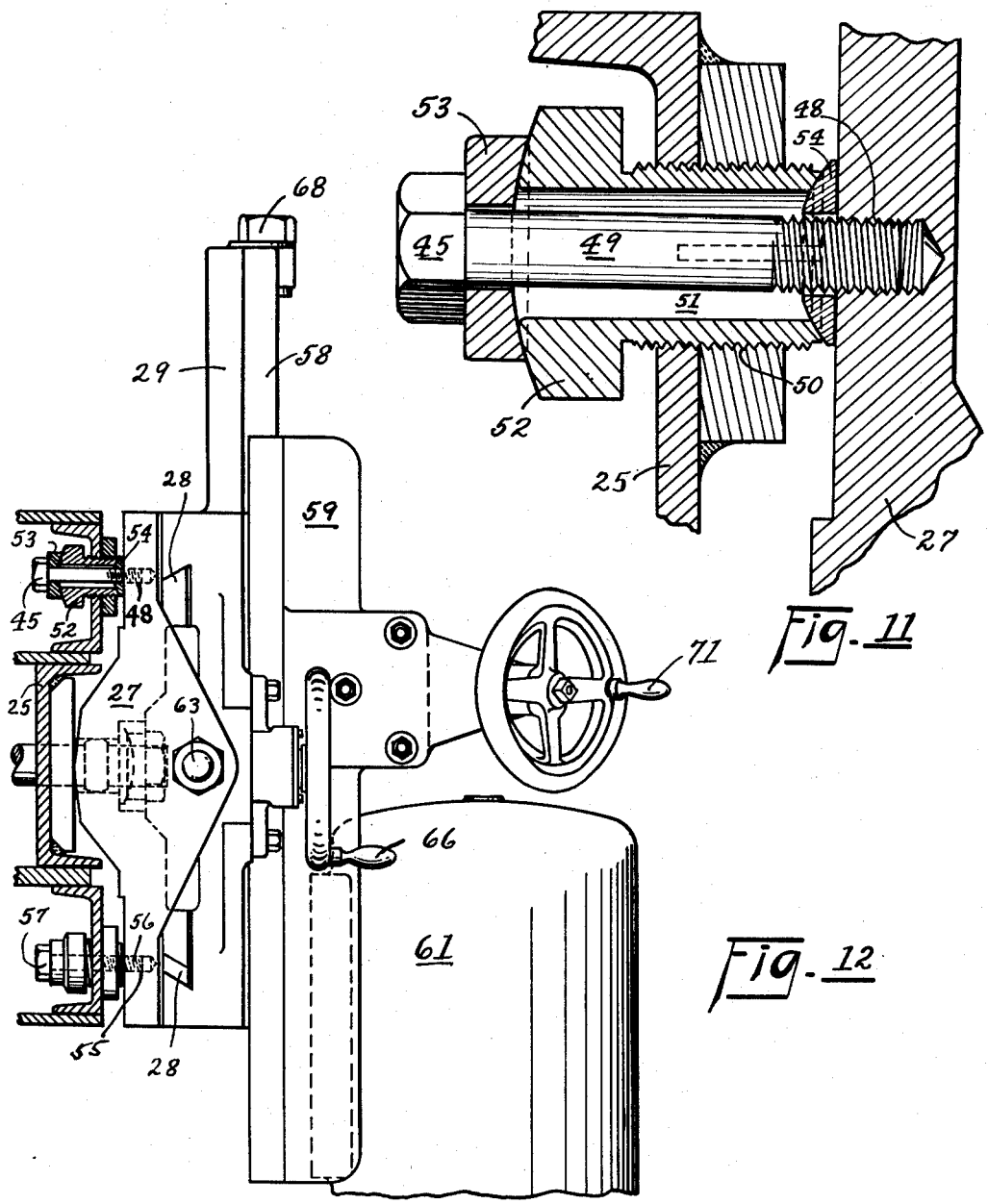

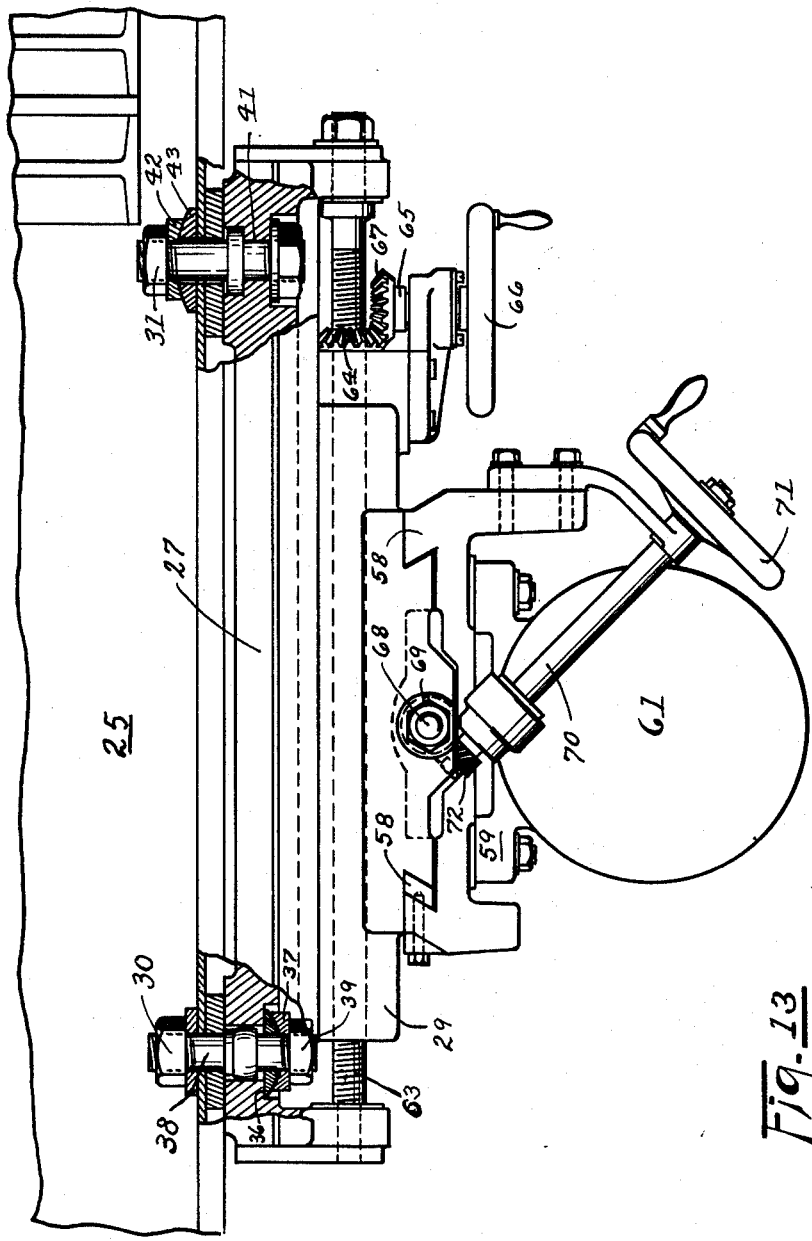

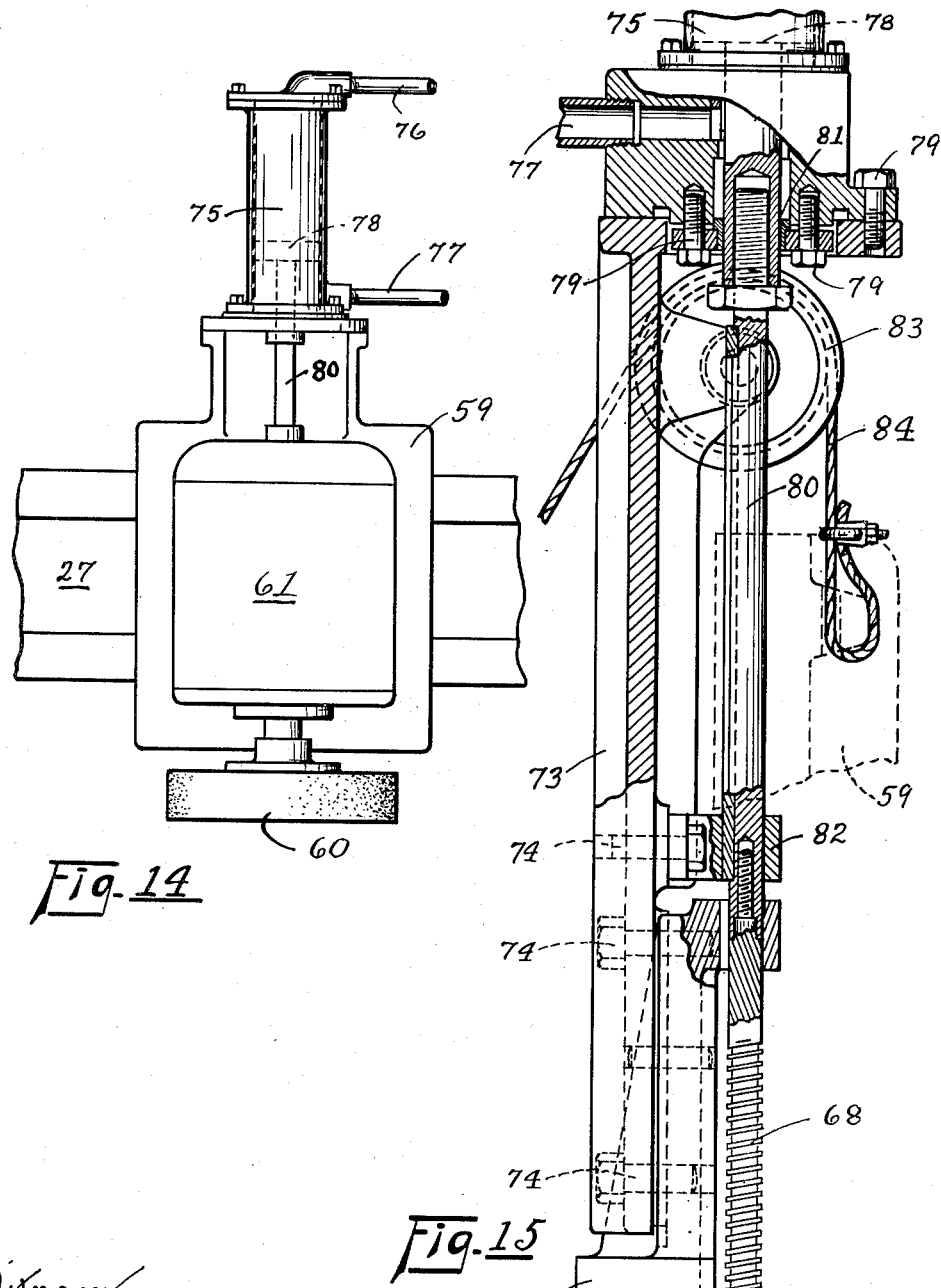

May 1, 1945.  H. FRAUENTHAL ET AL  2,374,928
GRINDING, CUTTING OR BORING MACHINE
Filed Nov. 9, 1942  11 Sheets-Sheet 10

Witness!
Geo L. Chapel

Inventors
Harold Frauenthal
Harold Moore Lochrane
By Rice and Rice
Attorneys

May 1, 1945.  H. FRAUENTHAL ET AL  2,374,928
GRINDING, CUTTING OR BORING MACHINE
Filed Nov. 9, 1942   11 Sheets-Sheet 11
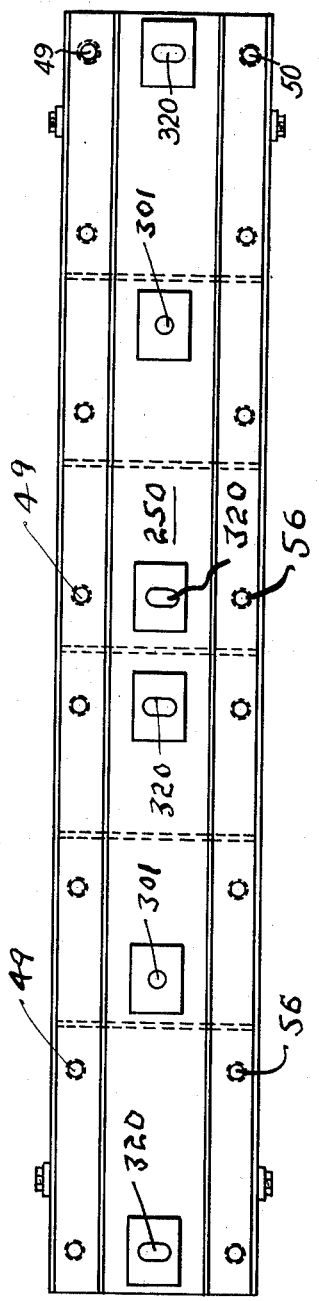
Witness:
Geo. L. Chapel
Inventors
Harold Frauenthal
Harold Moore Lochrane
By Rice and Rice
Attorneys Patented May 1, 1945

2,374,928

UNITED STATES PATENT OFFICE 2,374,928

GRINDING, CUTTING, OR BORING MACHINE

Harold Frauenthal and Harold Moore Lochrane, Muskegon, Mich.; said Lochrane assignor to said Frauenthal Application November 9, 1942, Serial No. 464,966

9 Claims. (Cl. 51—56)

The present invention relates to a grinding, cutting or boring machine and more particularly to a machine for effecting vertical, horizontal or angular grinding, cutting or boring of roller path rings, roller bearing race rings or the like.

The primary objects of the instant invention are to provide a machine of the general character above indicated whereby precision grinding, cutting or boring of such rings or parts may be relatively quickly effected; to provide such a machine having a work supporting turntable on which the rings or parts may be detachably secured during the grinding, cutting or boring operation; to provide such a machine whose turntable is carried by a rotatable spindle rotating in large bearings, one in the upper part of its housing secured close to its supporting base, the other in the lower section of the housing which section is provided with means of securing by leading or grouting to thereby stabilize the turntable and thus reduce vibration to a minimum; to provide such a machine whose work supporting turntable permits of relatively faster and more accurate grinding, cutting or boring; to provide such a machine whose grinding, cutting or boring tool supporting frame is stabilized independently of the work supporting turntable thereby precluding harmonic vibration between the turntable and frame; to provide such a machine having adjustable dual tool supporting guides mounted on the cross rail of the frame whereby horizontal, vertical or angular grinding, cutting or boring may be simultaneously effected; to provide such a machine whose dual guides may be adjustably locked to the cross rail of the frame to thereby allow for correcting any distortion between the tool carrying frame and the work supporting turntable and whereby the tools may be properly aligned with respect to the work supporting turntable after installation of the machine; and, to provide such a machine whose tools may be hydraulically reciprocated for vertical or horizontal motion and short stroke cylinders may be used in conjunction with a manually operated rotatable nut integral with the sliding member of the compound which is engaged to a screw extension of the hydraulic ram to thereby extend the range of reciprocating motion over a longer length of travel than the cylinders otherwise could give. The above may be accomplished while either vertical or horizontal cylinders are in motion, which may be adjusted by setting stops for any length of travel desired.

Illustrative embodiments of the invention are shown in the accompanying drawings, wherein:

Figure 1 is a front elevational view, partly in section on line 1—1 of Figure 2;

Figure 2 is a side elevational view thereof, partly in section on line 2—2 of Figure 1;

Figure 3 is a top plan view of the machine, certain parts thereof being broken away;

Figure 4 is an enlarged front elevational view of the cross head of the frame on which the dual tool supporting guides are adjustably mounted;

Figure 5 is an enlarged cross sectional view on line 5—5 of Figure 4;

Figure 6 is an enlarged cross sectional view on line 6—6 of Figure 4;

Figure 8 is a fragmentary front elevational view showing the adjustable dual tool supporting guides and the work supporting turntable;

Figure 9 is an enlarged fragmentary end elevational view, partly in section, showing the manner in which the tool supporting guides are adjustably tiltable relative to their vertical planes;

Figure 10 is an enlarged sectional view on lines 10—10 of Figures 1 and 8 showing the manner in which each guide is adjustably pivotally mounted adjacent its inner end;

Figure 11 is an enlarged sectional view on line 11—11 of Figure 1 showing the manner in which each tool supporting guide is adjustably tiltable relative to its vertical plane;

Figure 12 is an enlarged fragmentary side elevational view, partly in section to better show the manner in which each tool supporting guide is adjustably tiltable relative to its vertical plane;

Figure 13 is an enlarged fragmentary top plan view of the machine partly broken away to better show the manner in which the outer end of each guide is vertically adjustable;

Figure 14 is an enlarged fragmentary view illustrating the manner in which the tool may be hydraulically vertically actuated;

Figure 15 is a side elevational view, partly in section, of the supporting frame on which the tool is hydraulically vertically actuated;

Figure 17 is a front elevational view of a modified form of cross rail of the frame on which the dual tool supporting guides are adjustably mounted; and Figure 18 is a fragmentary side elevational view illustrating the manner in which a cutting tool may be employed when substituted for a grinding wheel as is shown in the other views.

Figure 7:
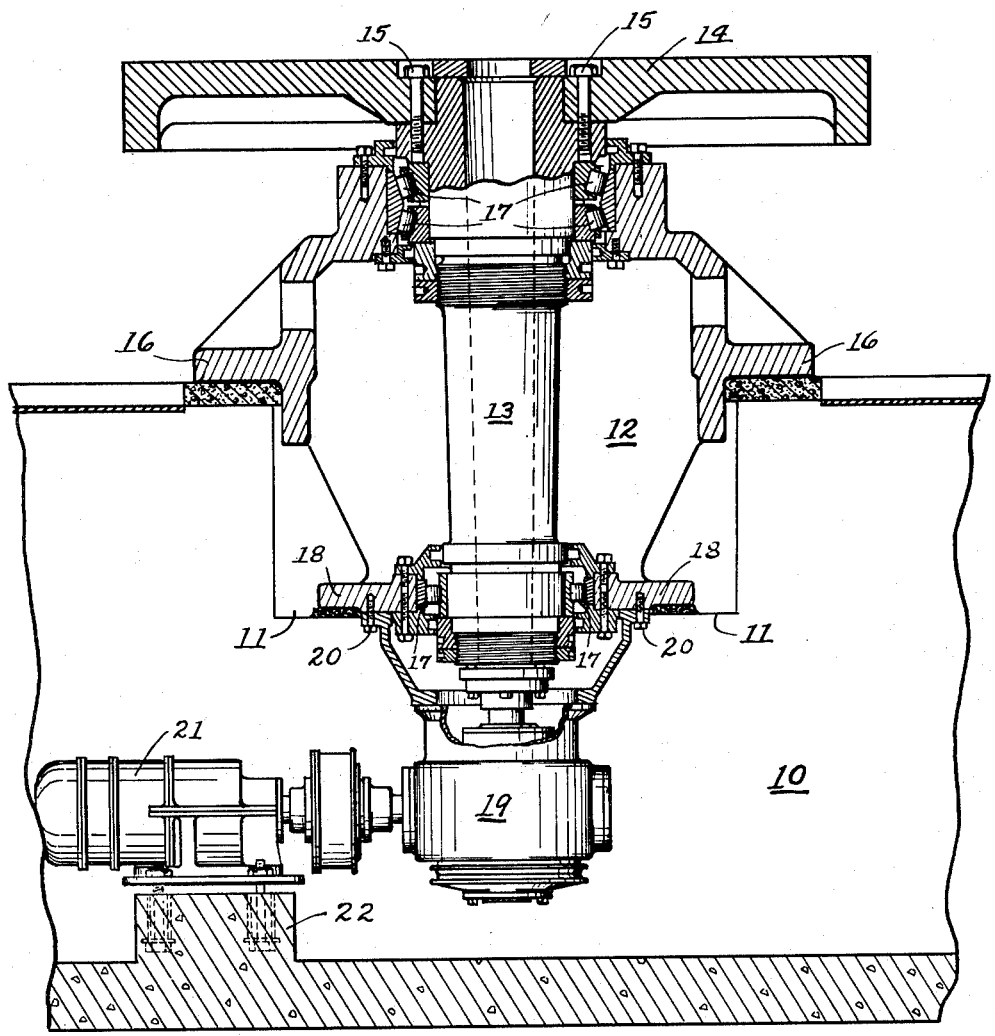
Figure 7 is an enlarged cross sectional view on line 7—7 of Figure 2.

Referring then to the drawings wherein like parts of the machine shown are designated by the same numerals in the several views, a rectangularly shaped pit 10 of poured reinforced concrete is provided with a shelf 11 on each of its opposite sides as best shown in Figures 1, 2 and 7.

The housing 12 for the vertically disposed rotatable spindle 13 on whose upper end the work supporting turntable 14 is secured as by bolts 15, is provided with a laterally flanged portion 16 which is seated upon the rim of the pit 10 providing obvious stability for the turntable 14 rotatable with its spindle 13 on its bearings 17.

The spindle housing 12 is further provided with laterally flanged feet 18 on its opposite sides, each seated upon and supported by an oppositely disposed shelf 11 of the pit 10 to which shelf each foot is secured by bolts providing additional stability.

A gear box 19 is suspended from the housing 12 by bolts 20 and an electrically driven motor 21 supported on a concrete block 22 is operatively connected to the spindle 13 through the gear box 19 to effect rotation of the work supporting turntable 14.

It will thus be seen that since the spindle housing is secured close to its supporting base, the work supporting turntable is likewise close to said base, reducing vibration because of its stabilization.

The frame on which the grinding, cutting or boring tools are carried generally comprises a pair of spaced vertically disposed uprights 23, set into a poured concrete base 24 and having a welded flanged reinforcing cross rail 25 at their upper ends. The uprights 23 are likewise preferably flanged to provide strength and each upright is further strengthened by a laterally offset triangular web portion 26.

Oppositely disposed guides 27, each provided with vertically spaced longitudinal ways 28 on which a tool carriage 29 is horizontally movable as hereinafter described, are each adjustably pivotally mounted on the cross rail 25 adjacent their inner ends by means of the bolt construction 30 best shown in Figures 10 and 13 and each guide 27 is vertically adjustable on the cross rail 25 at its outer end by means of the bolt construction 31 shown in Figure 13 within its vertical slot 32 as best shown in Figures 4 and 6.

Referring first to the bolt construction 30, best shown in Figure 10, the cross rail 25 on which each guide 27 is adjustably pivotally secured adjacent its inner end, is provided with a pair of horizontally disposed pivot bolt shank receiving apertures 33 for its bolt 30. Each guide 27 is likewise provided at its inner end with a pivot bolt shank receiving aperture 34 for the bolt 30 and each aperture 34 is provided with an annular recessed portion 35 at its outer end.

A pair of washers 36, 37 having adjacent concavo-convex meeting surfaces, embrace the shank 38 of the bolt 30 permitting of adjustable pivotal mounting of the inner end of each guide 27 on the cross rail 25 when the nut 39 is drawn tightly on its screw threaded bolt shank 38.

Referring next to the bolt construction shown in Figure 13, the cross rail 25 is provided at each of its outer ends with a vertically disposed bolt shank receiving slot 32 as best shown in Figure 6. Each guide is provided adjacent its outer end with a bolt shank receiving aperture 41 and a pair of washers 42, 43 having adjacent concavo-convex meeting faces, embrace the shank of the bolt 31 permitting of vertically adjustable mounting of each guide 27 on the cross rail 25 adjacent the outer end of each.

Each guide 27 is likewise adjustably tiltable on the cross rail 25 relative to its vertical plane by means of the bolt construction 45, best shown in Figure 11. Referring then to the bolt construction 45 and to Figures 4, 11 and 12, each guide 27 is provided with a plurality of horizontally spaced screw threaded bolt shank receiving bores 48 along its upper length and with similar bores 55 along its lower length. The cross rail 25 is provided with a plurality of horizontally spaced screw threaded apertures 50 along its upper and lower lengths respectively in registration with the bores 48 and 55 for the reception of the tubular screw threaded members 51 through which the shanks 49 and 56 of the bolts 45, 57 respectively pass and which are in screw threaded engagement with the bores 48 and 55.

The head 52 of each tubular member 51 is convex in form whereas the end of the shank of each tubular member is concave in form. A washer 53 having a concave inner surface is in concavo-convex meeting disposition with the convex head of the tubular member 51 and a washer 54 having a convex outer surface in concavo-convex meeting engagement with the concave end of the shank of each tubular member 51 provide means for adjustably tilting each guide relative to its cross rail 25 when the shank 49, 56 of each bolt 45, 57 is in adjusted screw threaded engagement with its bore 48.

Thus it is seen that each guide 27 may be vertically adjusted on the cross rail 25 at its outer end and that each guide may be adjustably tilted on the cross rail relative to its vertical plane, thereby permitting the correcting of any distortion between the tool carrying frame 23, 25 and the work supporting turntable 14.

In instances wherein it is desirable to adjustably vertically rockably mount each guide on the cross rail, the modified form of cross shown in Figure 17 is used. In this modified form, the cross rail 250 is provided with a center pivot bolt receiving aperture 301 and with oppositely disposed vertical slots 320 for each guide as will be clearly understood.

Each tool carriage 29 is provided with a pair of spaced vertical ways 58 on which the tool supporting block 59, carrying the tool 60 driven by the motor 61, is vertically movable, the tool being generally shown as a grinding wheel but in Figure 18 as a cutter 62.

Means for horizontally moving each tool carriage 29 comprises the fixed screw 63 disposed forwardly of its guide and secured adjacent the opposite ends thereof in any suitable manner and as best seen in Figure 13. A bevel gear 64 integral with a threaded nut mounted in the housing of the tool carriage 29 adjacent the outer edge thereof is in screw threaded embracing engagement with the fixed screw 63 and the shaft 65 of the hand wheel 66 is provided with a bevel gear 67 in meshing engagement with the bevel gear 64.

Thus, rotation of the hand wheel 66 in clockwise direction as seen in Figure 13 effects a movement of the tool carriage 29 to the left whereas a counter-clockwise movement of the hand wheel causes such member to be traveled to the right as seen in this view.

Means for vertically moving each tool supporting block 59 comprises the fixed screw 68 secured forwardly of each tool carriage 29 adjacent opposite ends thereof. A worm gear 69 integral with a threaded nut is in screw threaded embracing engagement with the fixed screw 68 and the shaft 70 of the hand wheel 71 mounted on the tool supporting block 59 is provided with a worm gear 72 in meshing engagement with the worm gear 69.

Thus, rotation of the hand wheel 71 in clockwise direction as best shown in Figure 13 elevates the tool supporting block 59 whereas a counter-clockwise rotation of the hand wheel causes the block to be lowered.

Figure 16:
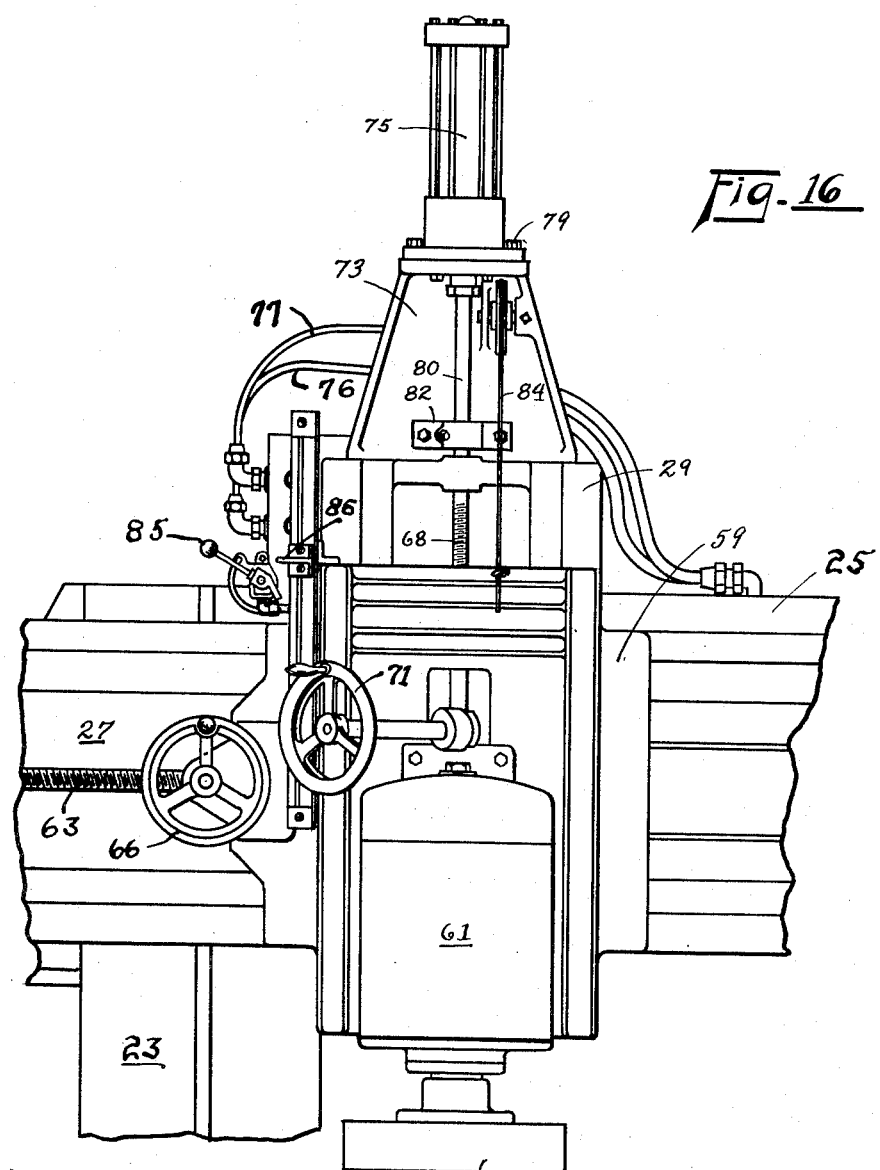
Figure 16 is a fragmentary front elevational view showing one of the hydraulically vertically actuated tools.

In instances wherein it is desired to vertically reciprocate the grinding tool 60, hydraulic means may be employed. Referring to Figures 14, 15 and 16, a vertically disposed head 73 is secured to the upper end of the tool carriage 29 in any suitable manner as by bolts 74 or it may be integral therewith.

A hydraulically operated motor 75 of conventional type having oppositely disposed intake-discharge conduits 76, 77 on the opposite sides of its piston 78 and whose ports are alternately opened and closed by the valve 85 controlled by the vertically adjustable reciprocating dog 86 is mounted on the upper end of the head 73 as by bolts 79 and a rod 80 disposed within its spaced bearings 81, 82 is screw threadedly secured at its upper end to the piston 78 and at its lower end to the screw 68.

The head is provided with a pulley wheel 83 and a cable 84 carried thereby is secured at one end to the tool supporting block 59 and its other end may be secured to a counter weight or wound on a spring actuated drum, not shown. Thus, reciprocation of the hydraulic piston 78 effects a vertical reciprocation of the tool supporting block 59 and its grinding tool 60 since the piston 78 is secured to the screw 68 by means of the rod 80.

A wide range of vertical reciprocation of the tool 60 is possible although the maximum travel of the hydraulically operated piston 78 of the motor 75 is relatively slight since each tool carriage 29 is vertically adjustable on its tool supporting block 59 by means of the hand wheel 71 operatively connected with the relatively long fixed screw 68.

It will thus be seen that since the work supporting turntable is secured close to its supporting base, minimizing vibration and, since the tool carrying frame is independently stabilized, precision grinding, cutting and boring of roller pad rings, roller bearing race rings and the like may be rapidly done after each guide has been corrected as to distortion with respect to the turntable on which the rings are detachably secured.

Thus, the machine herein shown and described is capable of accomplishing precision vertical, horizontal and angular grinding, cutting or boring and while but several specific embodiments of the invention have been herein shown and described, it will be understood that certain details of the constructions shown may be altered or omitted without departing from the spirit of the invention as the same is defined by the following claims.

We claim:

1. A machine of the class described comprising a stabilized horizontally disposed work supporting turntable, an independently stabilized frame having a horizontally disposed cross rail above the turntable, a horizontally disposed compound vertically adjustably secured to the cross rail at one end thereof and adjustably tiltably secured thereto relative to its vertical plane, a horizontally disposed screw fixedly secured to the compound, a tool carriage carried by the fixed screw, means for moving the carriage on the fixed screw, and a tool supporting block vertically movable on the tool carriage.

2. A machine of the class described comprising a stabilized horizontally disposed work supporting turntable, an independently stabilized frame having a horizontally disposed cross rail above the turntable, a horizontally disposed compound vertically adjustably secured to the cross rail at one end thereof and adjustably tiltably secured thereto relative to its vertical plane, a horizontally disposed screw fixedly secured to the compound, a tool carriage carried by the fixed screw, means for moving the carriage on the fixed screw, a vertically disposed screw fixedly secured to the tool carriage, a tool supporting block carried by the second fixed screw, and means for moving the block on the second fixed screw.

3. A machine of the class described comprising a stabilized horizontally disposed work supporting turntable, an independently stabilized frame having a horizontally disposed cross rail above the turntable, a horizontally disposed compound vertically adjustably secured to the cross rail at one end thereof and adjustably tiltably secured thereto relative to its vertical plane, a horizontally disposed screw fixedly secured to the compound, a tool carriage having a bevelled gear nut screw threadedly embracing the fixed gear, a hand wheel provided with a shaft having a bevelled gear in meshing engagement with the bevelled gear nut for moving the carriage on the fixed screw, and a tool supporting block vertically movable on the carriage.

4. A machine of the class described comprising a stabilized horizontally disposed work supporting turntable, an independently stabilized frame having a horizontally disposed cross rail above the turntable, a horizontally disposed compound vertically adjustably secured to the cross rail at one end thereof and adjustably tiltably secured thereto relative to its vertical plane, a horizontally disposed screw fixedly secured to the compound, a tool carriage having a bevelled gear nut screw threadedly embracing the fixed gear, a hand wheel provided with a shaft having a bevelled gear in meshing engagement with the bevelled gear nut for moving the carriage on the fixed screw, a vertically disposed screw fixedly secured to the carriage, a tool supporting block having a bevelled gear nut screw threadedly embracing the second fixed gear, and a hand wheel provided with a shaft having a bevelled gear in meshing engagement with said second bevelled gear nut for moving the block on the second fixed screw.

5. A machine of the class described comprising a stabilized horizontally disposed work supporting turntable, an independently stabilized frame having a horizontally disposed cross rail above the turntable, a horizontally disposed compound vertically adjustably secured to the cross rail at one end thereof and adjustably tiltably secured thereto relative to its vertical plane, a horizontally disposed screw fixedly secured to the compound, a tool carriage carried by the fixed screw, means for moving the carriage on the fixed screw, a vertically disposed screw fixedly secured to the tool carriage, a tool supporting block carried by the second fixed screw, means for moving the block on the second fixed screw, and a hydraulic motor having a piston rod fixedly secured to the second screw for vertically reciprocating the block.

6. A machine of the class described comprising a stabilized horizontally disposed work supporting turntable, an independently stabilized frame having a horizontally disposed cross rail located above the turntable, a horizontally disposed guide pivotally connected at one end to the cross rail for pivotal adjustment on a horizontal axis, means for pivotally mounting the guide on a longitudinal axis substantially at right angles to said horizontal axis for tilting adjustment of said guide, a horizontally disposed screw fixedly secured to the guide, a tool carriage slidable along the guide and actuated by said fixed screw, a vertically disposed screw fixedly secured to the tool carriage, a tool supporting block mounted on the tool carriage and actuated by said second fixed screw, a hydraulic motor having a piston rod connected witth said second screw for vertically reciprocating the block, and a counterweight for the block.

7. In a machine of the class described, a spindle housing foundation of poured concrete having a pit, a pair of whose oppositely disposed walls are each provided with a shelf, a spindle housing disposed within the pit and whose lower portion is supported on said pair of shelves and whose upper portion overhangs the floor of the foundation and is supported thereby, a rotatable vertically disposed spindle within the housing having a horizontally disposed work supporting turntable secured to its upper end, a frame comprising a pair of spaced vertically disposed uprights whose feet are stabilized in concrete poured independently of the poured pit concrete, a horizontally disposed cross rail secured to the uprights and located above the turntable, a pair of spaced horizontally disposed guides, each pivotally connected at one end to the cross rail for pivotal adjustment on a horizontal axis, means for mounting the guides for tilting movement on a longitudinal axis substantially at right angles to said horizontal axis, a tool carriage horizontally movable on each guide, and a tool supporting block vertically movable on each tool carriage.

8. A machine of the class described comprising a horizontally disposed work supporting turntable, a frame having a horizontally disposed cross rail arranged above the turntable, a horizontally disposed guide pivotally connected at one end to the cross rail for pivotal adjustment on a horizontal axis, means for mounting the guide for tilting movement on a longitudinal axis substantially at right angles to said horizontal axis, a tool carriage horizontally movable on the guide, and a tool supporting block vertically movable on the tool carriage.

9. A machine of the class described comprising a horizontally disposed work supporting turntable, an independently arranged frame having a horizontally disposed cross rail located above the turntable, a pair of spaced horizontally disposed guides, each pivotally connected at one end to the cross rail for pivotal adjustment on a horizontal axis, means for mounting the guides for tilting movement on a longitudinal axis substantially at right angles to said horizontal axis, a tool carriage horizontally movable on each guide, and a tool supporting block vertically movable on each tool carriage.

HAROLD FRAUENTHAL.
HAROLD MOORE LOCHRANE.